(12) United States Patent
Parry et al.

(10) Patent No.: US 6,980,137 B2
(45) Date of Patent: Dec. 27, 2005

(54) SYSTEMS AND METHODS FOR DATA CONVERSION

(75) Inventors: Travis J. Parry, B ise, ID (US); Roger Scott Twede, M ridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 267 days.

(21) Appl. No.: 10/104,822

(22) Filed: Mar. 22, 2002

(65) Prior Publication Data

US 2003/0179112 A1    Sep. 25, 2003

(51) Int. Cl.[7] .......................... H03M 7/00; H04M 11/00
(52) U.S. Cl. ................. 341/50; 379/102.01; 379/88.14
(58) Field of Search .................... 341/50; 379/102.01, 379/102.02, 100.08, 88.13; 707/204, 200; 709/206

(56) References Cited

U.S. PATENT DOCUMENTS

| | | | |
|---|---|---|---|
| 5,870,549 A | * | 2/1999 | Bobo, II ..................... 709/206 |
| 5,928,325 A | * | 7/1999 | Shaughnessy et al. ...... 709/206 |
| 5,974,449 A | * | 10/1999 | Chang et al. ................ 709/206 |
| 6,092,114 A | * | 7/2000 | Shaffer et al. .............. 709/232 |
| 6,130,917 A | * | 10/2000 | Monroe ...................... 375/295 |
| 6,401,059 B1 | * | 6/2002 | Shen et al. .................... 703/27 |
| 6,529,556 B1 | * | 3/2003 | Perdue et al. ............... 375/260 |
| 6,567,828 B2 | * | 5/2003 | Inohara et al. .............. 707/204 |
| 6,658,625 B1 | * | 12/2003 | Allen .......................... 715/523 |
| 2002/0095433 A1 | * | 7/2002 | Inohara et al. .............. 707/200 |
| 2002/0180755 A1 | * | 12/2002 | Krueger ...................... 345/601 |
| 2003/0177188 A1 | * | 9/2003 | Brubacher et al. .......... 709/206 |

* cited by examiner

Primary Examiner—Peguy jeanPierre (57) ABSTRACT

Systems and methods for automatically converting data received from a remote device are described. A representative data conversion system includes at least a first remote device. The system also includes a conversion device communicatively coupled to at least the first remote device. The conversion device is configured to receive information from at least the first remote device, wherein the information is configured to enable conversion of data from a first format to a second format. Other methods, devices, and programs are included.

20 Claims, 7 Drawing Sheets

SYSTEMS AND METHODS FOR DATA CONVERSION

FIELD OF THE INVENTION

The present invention generally relates to data manipulation. More specifically, the invention relates to systems and methods for converting data.

DESCRIPTION OF THE RELATED ART

Since the advent of computer systems, digital information has become a valuable asset. The processing of digital information has developed with improvements in the computer systems. For instance, several relatively large main frame systems were required to process the same amount of information that a notebook computer can process today.

Generally, the development of hardware (i.e. microprocessors, memory, etc.) has increased the processing speed and reduced the overall size of computer systems. The development of software that runs on computer systems has also contributed to improving the processing of digital information. Application software, in particular, has improved processing the digital information. One side effect that has accompanied the development of application software, however, is that the software tends to require the digital information to be in a specific format. Once the information is in the specific format, the application software can process the information more efficiently.

The need for application-specific formats has, obviously, created a wide variety of formats. Generally, when data, or information, is passed from one application to the next, or perhaps from one device to the next, the data typically is converted from a first format to a second format. The resources required to perform the conversion may be available within one of the applications, or perhaps external to either of the applications. Either way, a significant amount of resources (which, in some applications, may be referred to as "drivers"), in the form of programming language, and in turn, memory to store the programming language, are required to convert data from one particular format to another. Additionally, a separate set of resources may be required to convert the data from the first format to a third format. With many different data formats, many different sets of resources may be required, thus taking up valuable memory space in the computer systems.

Another potential problem is that the locations of the resources tend to be decentralized. Typically, one will find that a particular computer system does not have the resources needed to convert data from a particular first format to a particular second format. The resources may be found external to the computer system, and thus may require the user to do extensive searching and/or unwanted installation procedures.

Therefore, there is a need for improved systems and methods that address the aforementioned and/or other short comings of the prior art.

SUMMARY OF THE INVENTION

The present invention relates to automatically converting data received from a remote device. In this regard, a representative data conversion system includes at least a first remote device. The system also includes a conversion device communicatively coupled to at least the first remote device. The conversion device is configured to receive information from at least the first remote device, wherein the information is configured to enable conversion of data from a first format to a second format.

Another embodiment may be construed as a representative method for converting data. The method comprising of: receiving information to convert data automatically from a first format to a second format; enabling conversion of the data from the first format to the second format; and processing the data automatically. The information received determines a manner in which the data is to be processed.

In other embodiments, the invention may be construed as a data conversion device comprising: means for receiving information to convert data automatically from a first format to a second format; means for converting the data from the first format to the second format; and means for processing the data automatically, wherein the information received determines a manner in which the data is to be processed.

In yet other embodiments, the invention may be construed as a data conversion program stored on a computer readable medium. The conversion program comprising of: logic configured to receive information to convert data automatically from a first format to a second format; logic configured to convert the data from the first format to the second format; and logic configured to process the data automatically, wherein the information received determines a manner in which the data is to be processed.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in greater detail herein, methods, systems, devices and programs of the invention can convert data. In this regard, the data can be converted from a first format to a second format. By so doing, the necessary resources required to convert data can be accessed in one general location by a wide variety of devices.

Figure 1:
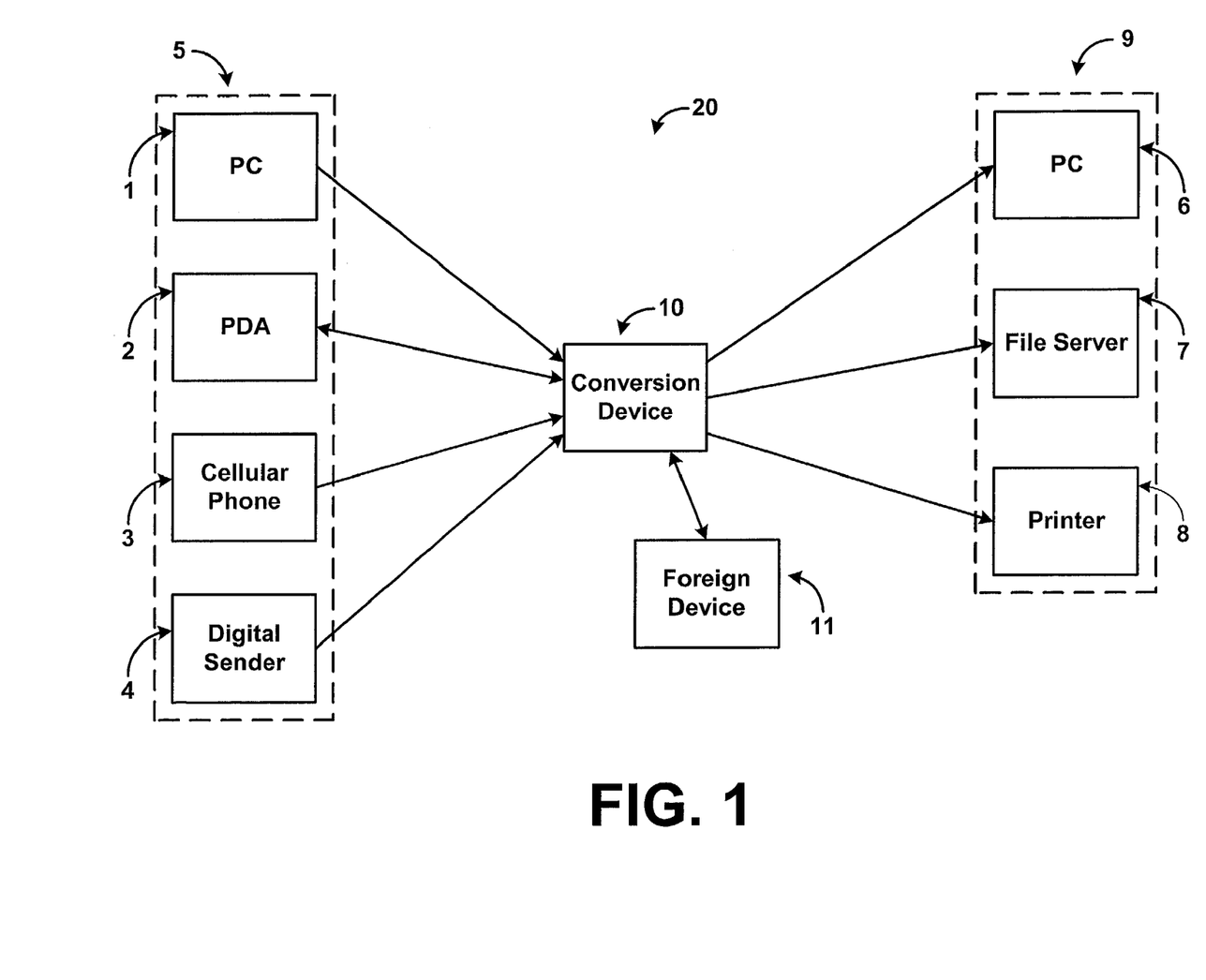
FIG. 1 is a schematic representation of an embodiment of the present invention.

Referring now in more detail to the drawings, in which like numerals indicate corresponding parts throughout the several views, FIG. 1 is a schematic representation of an embodiment of the present invention. Shown in FIG. 1 is a data conversion system 20. The data conversion system 20 includes three general types of components: remote devices 5, a conversion device 10, and recipient devices 9. Several remote devices 5 may be in communication with the conversion device 10 as well as several recipient devices 9. In some embodiments, a foreign device 11 may also be in communication with the conversion device 10. Examples of the remote devices 5 displayed in this representation are a personal computer (PC) 1, a personal digital assistant (PDA) 2, a cellular phone 3, and a digital sender 4. Examples of the recipient devices 9 displayed in this representation are another PC 6, a file server 7, and a printer 8. It should be noted that the communication between the devices may be indirect or direct.

A remote device 5 can be any device that is or can be configured to communicate electronically with the conversion device 10. Described in this embodiment are four examples of a remote device 5. It should be noted, however, that there are several other remote devices that could be used, such as a notebook computer or a wireless pager, for example.

The first example of the remote devices 5 is the PC 1. In the most general sense, the PC 1 is an appliance that is used by a user to perform a wide variety of applications such as word processing, graphical drawing, "surfing" the Internet, etc. The PC 1 can be configured to connect to the Internet, a local area network (LAN), and/or to another PC. Generally, a network interface device could be used to connect the PC 1 to another appliance. The PC 1 could communicate with the conversion device 10 directly or over the Internet and/or a LAN.

The second example of the remote device 5 is the PDA 2. The PDA 2 is a small mobile hand-held device that provides computing and information storage and retrieval for personal or business use, often for keeping schedule calendars and address book information. The PDA 2 can be configured to communicate wirelessly using radio frequency (RF) and/or satellite communication to an intermediary device that can continue the communication on a network.

Another example of a remote device 5 is the cellular phone 3. The cellular phone 3 is an appliance that has the same general features of a standard telephone. More recent models of cellular phones have extended capabilities such as text messaging, web browsing, and electronic mail (email) capabilities. Cellular phones communicate by using cellular technology. Generally, RF transmissions are sent/received by the cellular phone 3 and, likewise, received/sent by a remote transceiver or satellite. From there, the transmissions may be sent through other transmission media.

A fourth example of a remote device 5 is the digital sender 4. The digital sender 4 is an appliance that can scan an image or document from a piece of paper, convert the image or document to digital information, and then send the digital information to another appliance(s). Typically, the digital sender 4 could communicate with the conversion device 10 over the same general medium.

A recipient device 9 has the same general characteristics of a remote device 5. In fact, in some embodiments, the recipient device 9 may be the originating remote device. Generally, the recipient device 9 is an appliance that can receive information from the conversion device 10. From there, the received information may be processed in a wide variety of ways according to the functionality of the particular recipient device 9. Although three examples of a recipient device 9 are described, it should be noted that there are several other recipient devices that could be used such as a notebook computer, a plotter, or a visual display appliance, for example.

The first example of a recipient device 9 is the PC 6. The PC 6 is similar to the PC 1.

The second example of a recipient device 9 is a file server 7. Generally, a file server 7 is a computing appliance that stores large amounts of information. A file server 7 is similar to the PC 6 in that, generally, it contains memory (typically much more than a PC), a processing unit, a network interface(s), and input/output interfaces. The file server 7 is typically found in a corporate environment where the file server 7 is connected to a LAN. Several client machines may also be connected to the LAN. Information that normally is stored on client machines may be centralized in the file server 7. The information can be accessed by communicating with the file server through the LAN, or externally via the Internet.

A third example of a recipient device is the printer 8. The printer 8 can render digital information onto paper. The printer 8 may be connected to the PC 6 or may be directly connected to a network, therefore either communicating with the conversion device 10 directly or indirectly, via the PC 6.

The description of the conversion device 10 can best be made by describing the general functionality of the device. A structural description has been included in FIG. 2 as well. The conversion device 10 can first receive information from a remote device 5. Generally, the information received will include instructional information and reference to the data that is to be converted. One means of communicating the information is by email. Email is the exchange of computer-stored messages by telecommunication. The general concept of email is well known in the art, so an explanation of the general concept has been excluded. In this embodiment, an email could be sent from a remote device 5 to the conversion device 10.

Typically, the email will include instructional information. In some embodiments, the email may also include the data to be converted as an attachment. In this case, the conversion device 10 can extract the data from the email and begin conversion of the data. In other embodiments, the email may also include a location of where the data is stored. In this case, the conversion device 10 can retrieve the data from the location. For example, the data may be stored in a file remotely stored on a web server. A Uniform Resource Locator (URL) may be included in the email sent to the conversion device 10. The URL is the address, or location, of the file located on the web server. The conversion device 10 could be configured to recognize the URL and retrieve the data from the URL. Once the data is retrieved, the conversion device 10 can begin converting the data. General descriptions of the email are given in FIG. 3 and FIG. 4.

Although email has been described as the "vehicle" for communication, several other technologies are available that could be used. For instance, the remote devices 5 and the conversion device 10 could be configured with the File Transfer Protocol (FTP). FTP is known in the art as one of the simplest ways to transfer data from one machine to another. A remote device 5 could be configured to download the information to the conversion device 5. The information could be stored in a file, which could contain the same basic information as described in the email. It should be noted that, although email and FTP are two possible means described, there are other comparable means and the invention is not intended to be limited by those mentioned herein.

Once the data that is to be converted has been received (or retrieved) by the conversion device 10, the conversion device 10 can begin to attempt to convert the data. Generally, the conversion device 10 would be configured to recognize what format the data is currently in and what format the data is to be converted into. If the conversion device 10 recognizes it has the capabilities to perform the conversion itself, the conversion operation could be performed. If the conversion device 10 does not have the available resources to perform the conversion, the conversion device 10 could be configured to "look" for outside help. The data could be provided to a foreign device 11. The foreign device 11 may have the available resources to perform the conversion. The foreign device 11 may be configured to convert the data from one format to an intermediary format. The data could then be provided to another foreign device (not shown) that has the resources to convert the data from the intermediary format to the second format originally desired. From there, the converted data could be provided back to the conversion device 10. It should be noted that it may be desired to convert the data into two formats, in which case, the conversion device 10 could be configured to perform all the conversion, or a foreign device(s) 11 could be used as well.

The foreign device 11 could be any computing device that can communicate with the conversion device 10. For example, the foreign device could be a PC similar to PC 1 or PC 6, or perhaps a server.

Once the data has been converted to its final format(s), the data can be processed further. The conversion device 10 could be configured to process the data itself, or perhaps send it to at least one of the recipient devices 9. Processing the data could be defined by several possible scenarios. Generally, for the purposes of this application, processing the data is some procedure or procedures performed on or to the data. How the data is to be processed could be decided by the user and communicated to the conversion device 10 through the information sent to the conversion device 10.

Several examples have been included to more fully describe embodiments of the present invention. First, it may be desired that a Microsoft Word™ document be converted to a Postscript format. Postscript is a well known programming language that describes the appearance of a printed page (i.e. the text and graphical representations). The conversion device 10 may perform the conversion and the converted data, in Postscript form, may be sent to the printer 8 for imaging. In that case, the converted data may be provided to the printer 8 by any means capable of doing so (i.e. email, FTP, direct connection, etc.). In other embodiments, the conversion device 10 may be configured to print the data itself.

In another example, it may be desired to convert image data from the Tag Image File Format (TIFF) to the Joint Photographics Experts Group (JPEG) format. JPEG images typically take up less space than TIFF images because the data is typically compressed. The PDA 2 may send an email to the conversion device 10 with a URL pointing to the TIFF data. The conversion device 20 can convert the TIFF data to the JPEG format. Once converted, the data (now in the JPEG format) may be provided to the PDA 2 via email, or FTP.

In yet another example, data may be converted from one format to another. The converted data can be sent to the file server 7 to be stored. The location on the file server 7 that the data is to be stored at could be included in the email sent from the remote device 5 to the conversion device 10.

It should be noted that these procedures could be accomplished automatically and without any human intervention.

Figure 2:
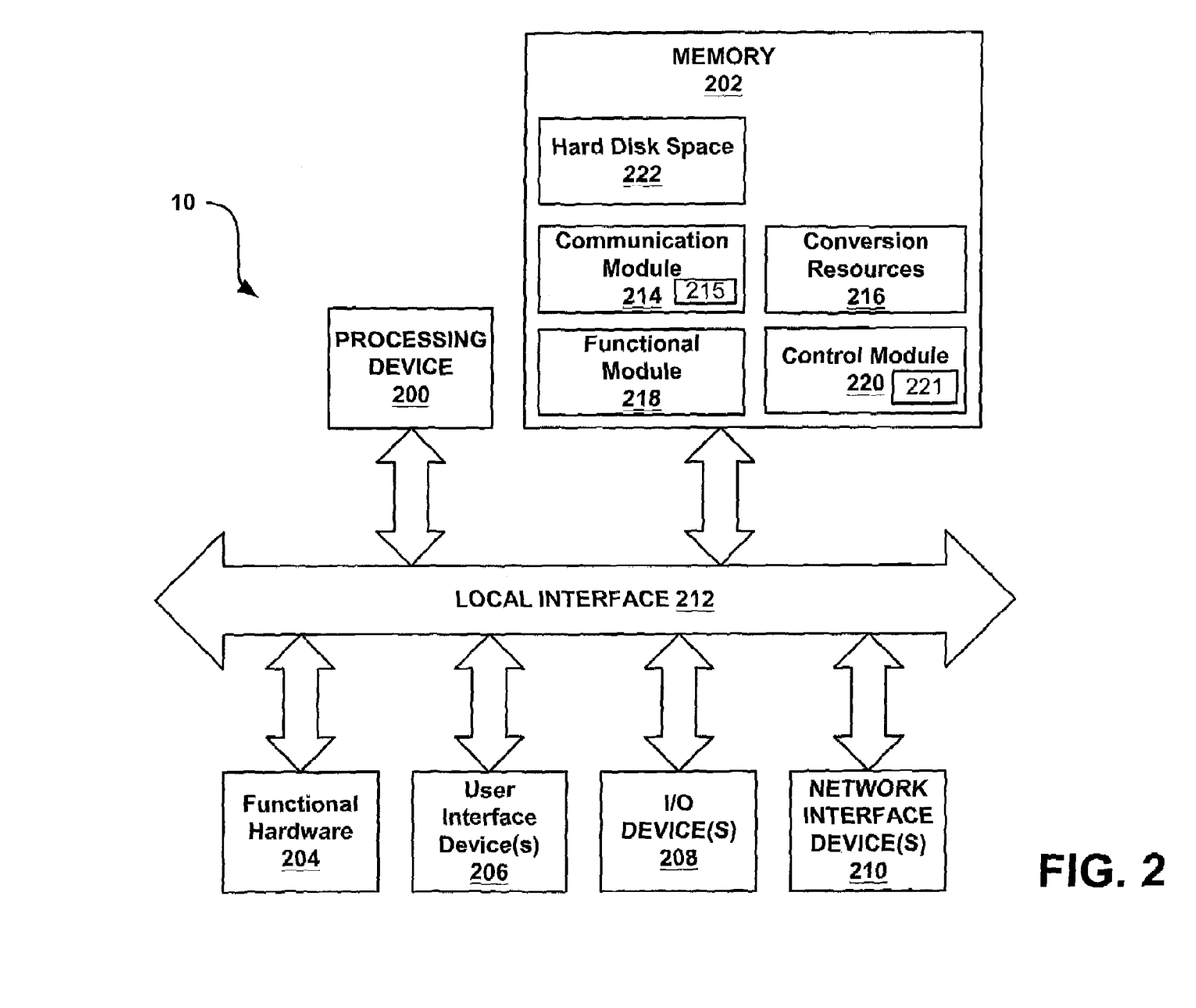
FIG. 2 is a schematic representation of the conversion device 10 of FIG. 1.

Reference is now made to FIG. 2, which is a schematic representation of the conversion device 10 of FIG. 1. As indicated in FIG. 2, the conversion device 10 can comprise a processing device 200, memory 202, functional hardware 204, one or more user interface devices 206, one or more input/output (I/O) devices 208, and one or more network interface devices 210. Each of these components is connected to a local interface 212 that, by way of example, comprises one or more internal buses. The processing device 200 is adapted to execute commands stored in memory 202 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the conversion device 10.

The functional hardware 204 may be hardware that can provide more functionality to the conversion device 10. For example, the conversion device may have printing capabilities, in which case, the functional hardware 204 may have a print engine and other devices to perform the printing.

The one or more user interface devices 206 typically include interface tools with which the device settings can be changed and through which the user can communicate commands to the conversion device 10. By way of example, the user interface devices 206 may comprise one or more function keys and/or buttons with which the operation of the conversion device 10 can be controlled, and a display, such as a liquid crystal display (LCD), with which information can be visually communicated to the user and, where the display comprises a touch-sensitive screen, commands can be entered.

With further reference to FIG. 2, the one or more I/O devices 208 are adapted to facilitate connection of the conversion device 10 to another device and may therefore include one or more serial, parallel, small computer system interface (SCSI), universal serial bus (USB), IEEE 1394 (e.g., Firewire™), and/or personal area network (PAN) components. The network interface devices 210 comprise the various components used to transmit and/or receive data. By way of example, the network interface devices 210 include a device that can communicate both inputs and outputs, for instance, a modulator/demodulator (e.g., modem), wireless (e.g., radio frequency (RF)) transceiver, a telephonic interface, a bridge, a router, network card, etc.

The memory 202 includes various software (e.g., firmware) programs including communication module 214, conversion resources 216, functional module 218, a control module 220 and hard disk space 222. The various software programs may be operated on the devices located in the conversion device 10 by the processing device 200.

The communication module 214 comprises the various protocols required to communicate with other devices. The Simple Mail Transfer Protocol (SMTP) 215 may be one protocol found in the communication module 214. SMTP is a commonly used protocol to communicate via email as is the Post Office Protocol (POP). The FTP protocol (See FIG. 1), the Transfer Control Protocol/Internet Protocol (TCP/IP) suite, and the Hypertext Transfer Protocol (HTTP) may all be included in the communication module 214 to facilitate communication with other devices. The communication module 214 may work with the I/O device(s) 208, but more typically will work with the network interface device(s) 210 to facilitate communication.

The conversion resources 216 may include the necessary firmware and/or software to perform various types of data conversion.

The functional module 218 may contain the firmware and/or software to operate the functional hardware 204 if the conversion device 10 is so configured.

The control module 220 may include the firmware and/or software that comprises the logic to perform the general method of embodiments of the present invention. The control module 220 may be configured to operate with the communication module 214 to receive an email. A software program 221 may be included in the control module 220 which can translate the email and perform the general method. The software program 221 may again work with the communication module 214 to retrieve the data from a specific location. The software program 221 can then call on the conversion resources 216 to perform the conversion of the data. Once conversion is complete, the software program 221 may call on the functional module 218 to, for example, print the converted data. In other embodiments, the software program 221 may work with the communication module 214 to email the converted data back to the remote device 5. Integrity checking as well as quality control could be performed in the control module 220.

The hard disk space 222 could be used to store the data before and after conversion. Communication logs may also be stored in the hard disk space 222.

Various software and/or firmware programs required to perform the data conversion routine have been described herein as well as software and/or firmware required to operate a conversion device 10 to perform data conversion. It will be appreciated that the various software and/or firmware programs can be embodied in any computer-readable medium for use by or in connection with an instruction execution system, apparatus, or transmission device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the information system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable media would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
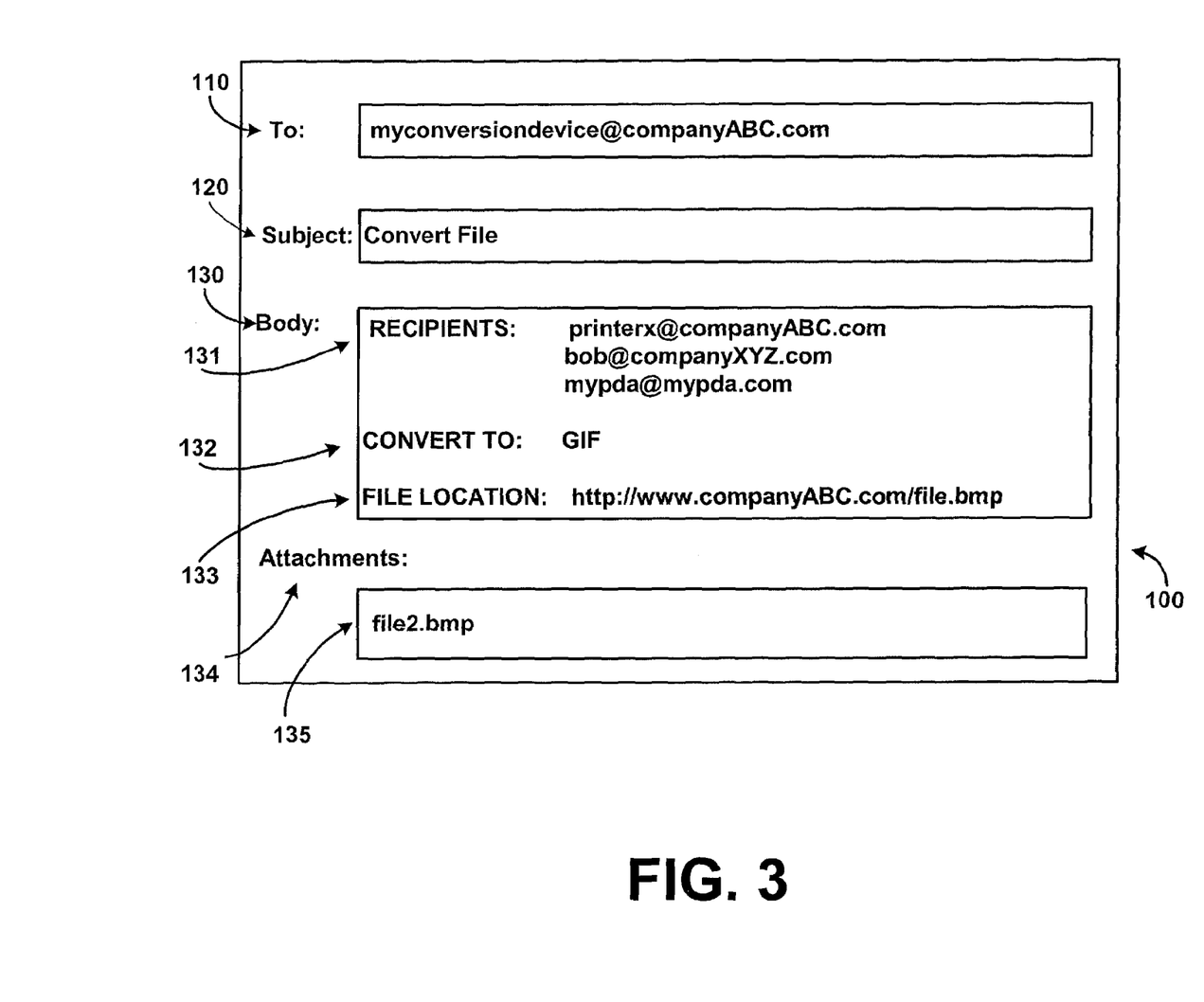
FIG. 3 is a schematic representation of an email as utilized in embodiments of the present invention.

FIG. 3 is a schematic representation of an email 100 as utilized in some embodiments of the present invention. The email 100 of FIG. 3 may be sent from the remote device 5 to the conversion device 10 (See FIG. 1). It should be noted that other means of communicating the information contained within the email 100 may be utilized, such a file transferred via FTP. The email 100 may include several fields, such as a To field 110, a Subject field 120, a Body field 130, and an Attachment field 134. The email 100 may include other fields not currently displayed in FIG. 3, such as a CC or Copy To field.

The To field 110 of email 100 may include the email address of the conversion device 10. Generally, the To field 110 includes the email address of the destination device.

The Subject field 120 of email 100 may include instructional information in the form of simple text. For example, the text "Convert File" is in the Subject field 120 displayed in FIG. 3. The text in the Subject field 120 may be interpreted by the software program 221 running on the conversion device 10. The instructional information may initiate the software program 221 to begin performing certain operations. For example, begin the conversion routine. Other instructional information may be included in the Subject field 120.

The Body field 130 of email 100 may comprise of several sub-fields such as a Recipient field 131, a Convert To field 132, and a File Location field 133. The Body field 130 may also comprise of other sub-fields that are pertinent to processing the data after conversion. In the recipient field 131, three sample email addresses are displayed: "printerx@companyABC.com", "bob@companyXYZ.com", and "mypda@mypda.com". The first sample email address may be the email address of the printer 8 (See FIG. 1), the second email address may be the email address of a co-worker, and the third email address may be the email address of the PDA 2 (See FIG. 1). Perhaps the PDA 2 sent the email 100 as well. Once the data is converted, it can be sent to the recipients in the Recipient field 131. It should be noted that the converted data may be sent in some other form other than email, although email is the preferred means in this embodiment.

The Convert To field 132 may include the format in which the data is to be converted into. Several formats could be listed in the Convert To field 132. The software program 221 could query the conversion resources 216 with the entries in the Convert To field 132, to see if conversion device 10 has the appropriate resources to perform the conversion.

The File Location field 133 may or may not be included in the Body field 130. The File Location field 133 may include a location for the data that is to be converted. Typically, the data would be stored in a remote file. The file could be referenced with a URL (See FIG. 1). Several other locations may also be included within the File Location field 133. The software program 221 could recognize that a location(s) was/were included in the email 100 and so would initiate, with the help of the communication module 214, retrieval of the referenced data.

An attached file 135 may be included with the email 100. It would be referenced in the Attachment field 134. Multiple files may be attached to the email 100 and contain a wide variety of data. The software program 221 could recognize that an attached file 135 was attached to the email 100 and could then attempt to begin the conversion process on the data in the attached file 135.

Figure 4:
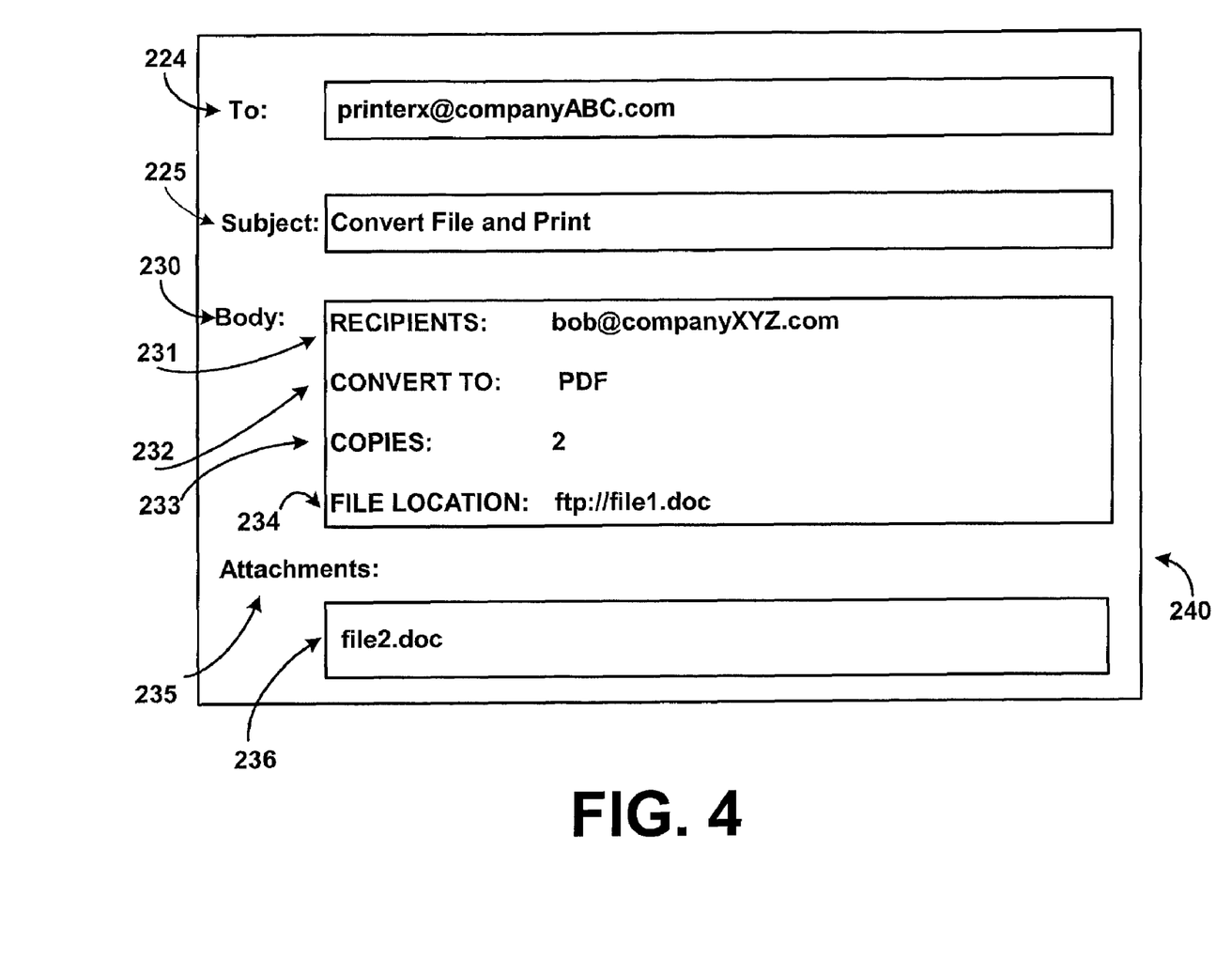
FIG. 4 is a schematic representation of another email as utilized in embodiments of the present invention.

FIG. 4 is a schematic representation of another email 240 as utilized in embodiments of the present invention. In this embodiment, the conversion device 10 can be a device that has printing capabilities (i.e. the functional hardware 204 and functional module 218 to print). Email 240 is similar to email 100 in that a To field 224, a Subject field 225, a Body field 230, and an Attachment field 235 may be included in the email 240. The To field 224 of email 240 comprises the email address of a printer, "printerx." The Subject field 225 is similar to that of email 100. In this embodiment, the command is to "Convert File and Print." The software program 221 could recognize the command and perform the proper operations. The Body field 230 is similar to that of email 100, except that a Copies field 233 has been included. The Copies field 233 includes the number of copies of the converted data that is to be printed by "printerx." Other fields pertaining to the print routine could be included in the email 240 such as Print Quality and Media Type. The File Location field 234 of email 240 could contain a reference to a FTP location. This would infer that the conversion device (e.g. "printerx") could communicate via FTP.

In other embodiments of the present invention, a variety of email addresses could be accessed by the conversion device 10. Some or all of the information that was included in the emails 100 and 240 of FIG. 3 and FIG. 4, respectively, could instead be intertwined into the specific email address. For example, an email address of the conversion device 10 could be set up so that an email could be sent to this address that would initialize the conversion device 10 to begin a specific, possibly frequent, operation. A user of the PDA 2 or the cell phone 3 could utilize this embodiment, and thus save time by avoiding the extra typing, which can oftentimes be quite cumbersome on these types of devices.

In the discussion that follows, flow charts are provided. It is to be understood that any process steps or blocks in these flow charts represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 5:
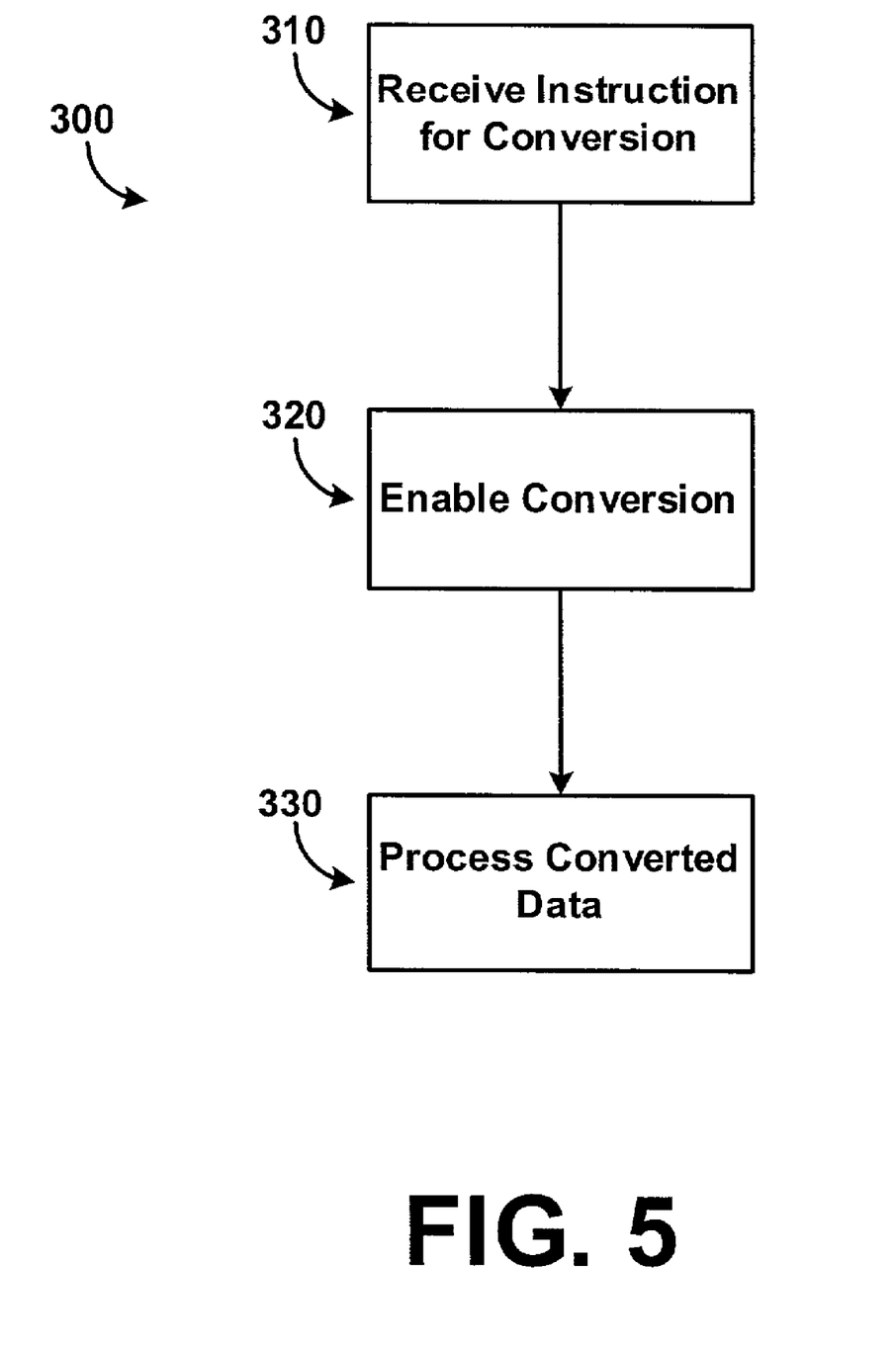
FIG. 5 is a flow chart illustrating a representative embodiment of a method of the present invention.

Reference is now made to FIG. 5, which is a flow chart illustrating a representative embodiment of a method of the present invention. The data conversion method 300 begins at step 310 where instructional information is received to perform the conversion. The data that is to be received can be included in the information received, or perhaps a reference to the data could be included. Generally, a conversion device 10 would receive the information from a remote device 5. As mentioned earlier, several possible communication routines could be used to communicate the information. Email is the preferred routine in this embodiment to communicate the information. Once the information has been received, the conversion of the data can begin (step 320). The conversion device 10 could perform this step. This step is discussed in more detail in FIG. 6. After the data has been converted, the data could be processed in a wide variety of way (step 330). The conversion device 10 could process the data, or a recipient device 9 that is provided the data could process the data. The various ways of processing the data are discussed in more detail in FIG. 7.

Figure 6:
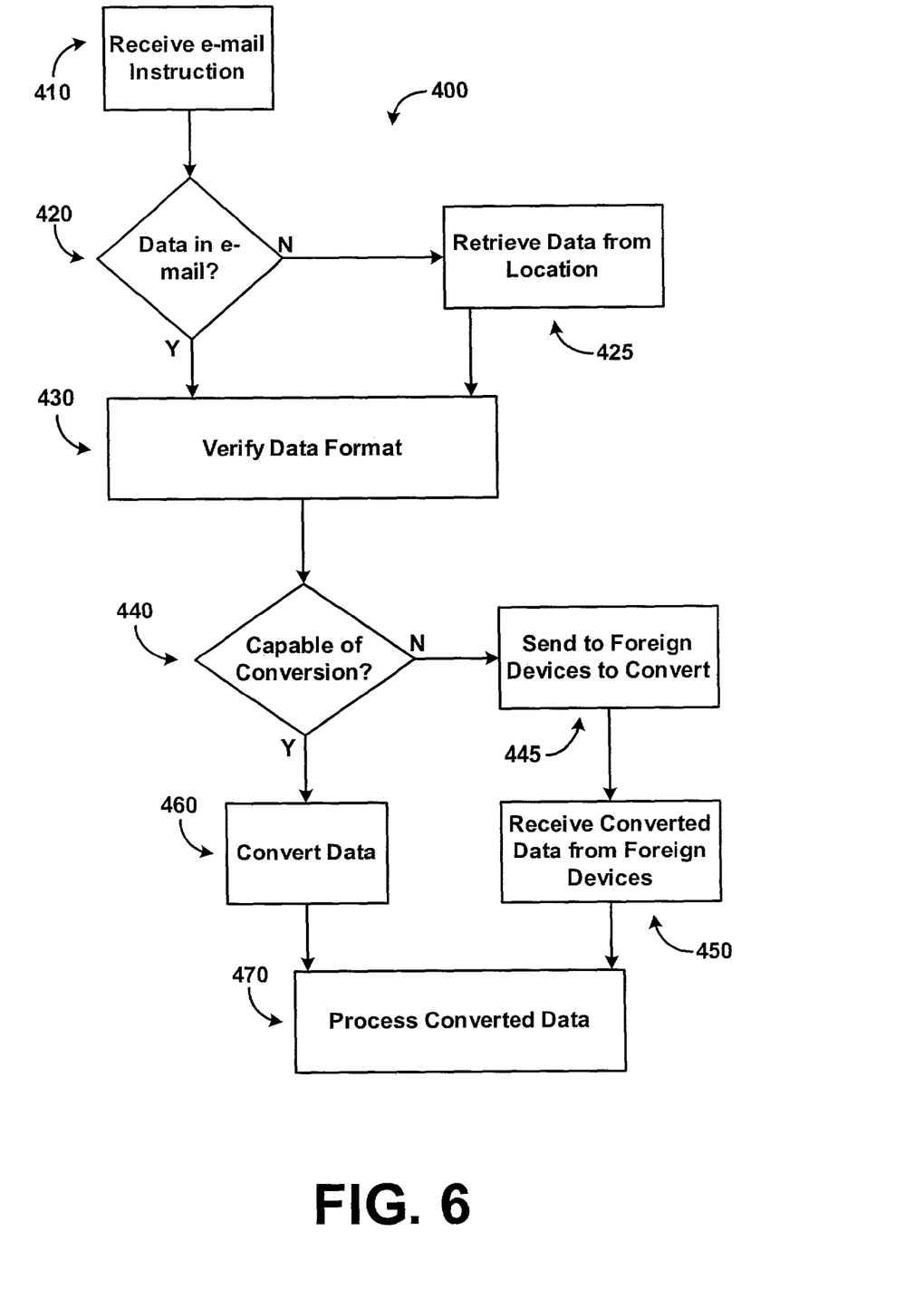
FIG. 6 is a flow chart illustrating a representative embodiment of a method as performed by the conversion device 10 of FIG. 1.
Figure 7:
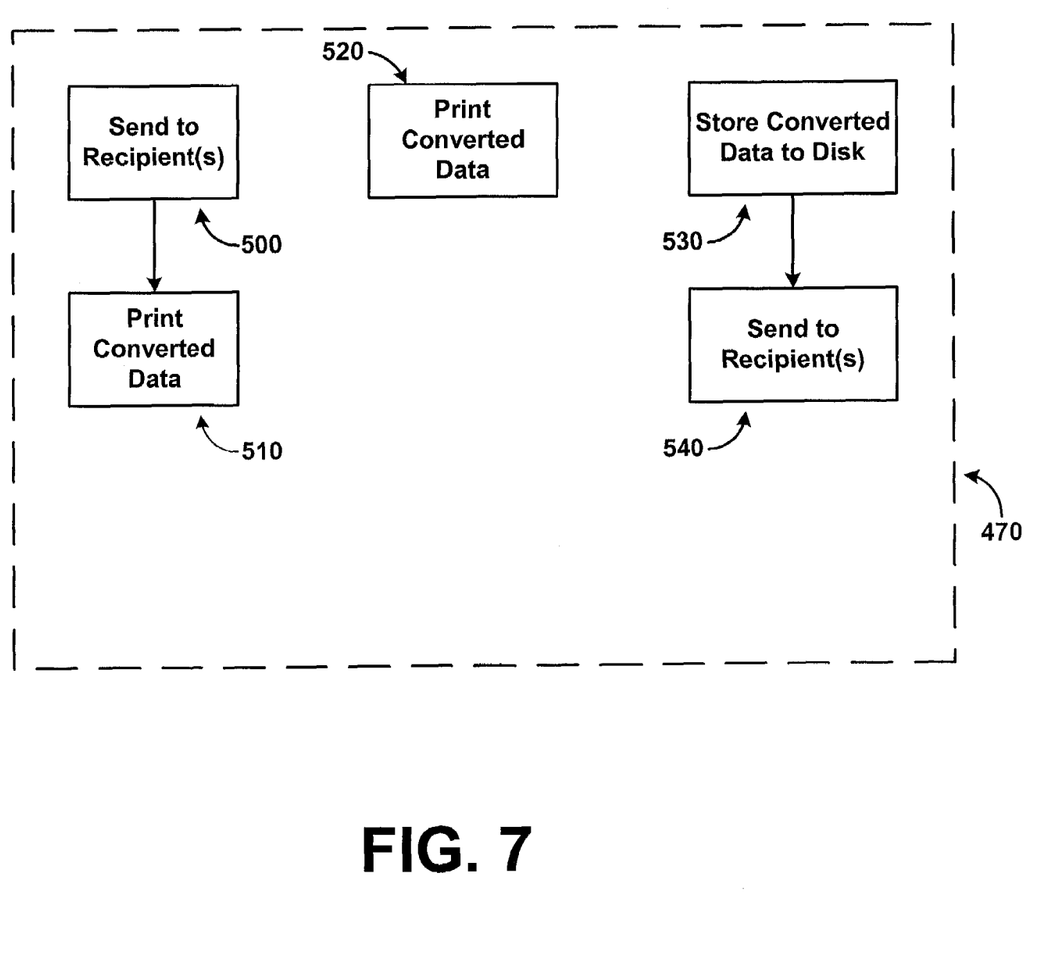
FIG. 7 is a flow chart illustrating various methods of processing the converted data.

FIG. 6 is a flow chart illustrating a representative embodiment of a method as performed by the conversion device 10 of FIG. 1. In this embodiment, email is the preferred means of communicating an instruction to the conversion device 10. The method 400 begins when conversion instructions are received via an email 100 (step 410). The software program 221 could recognize from the Subject field 120 what operations to perform. The email 100 is then checked to see if the data is contained within the email 100 (step 420). Typically, this would be an attached file 135 in the Attachment field 134. If the data is not included in the email 100, the data is retrieved from a location designated in the email 100 (step 425). Once the data is retrieved from either the email 100, or a location designated in the email 100, the formats of the data are verified (step 430). The current format(s) the data is in, as well as the format(s) the data is to be converted into are verified with the conversion resources 216 of the conversion device 10 to see if the conversion device 10 has the ability to perform the conversion. If so, the data is converted (step 460). In this case, the conversion device 10 could perform the conversion. If it was determined that the conversion device 10 did not have the available resources to convert the data, the data could be sent to a foreign device 11 to perform the conversion (step 445). Generally, the conversion device 10 could be knowledgeable of what foreign device(s) 11 can convert what data formats. The foreign device 11 may, in turn, send the data to another foreign device to perform the conversion. The converted data would then be received by the foreign device 11, or the last foreign device 11 in a chain of foreign devices (step 450). Once the data is converted, it can be further processed (step 470). As mentioned earlier, the processing of the data can be in several ways and include a variety of procedures. Likewise, a variety of devices may perform the procedures. FIG. 7 discusses in more detail how the data can be processed.

FIG. 7 is a flow chart illustrating various methods of processing the converted data. The step 470 of method 400 of FIG. 6 is described in more detail here in FIG. 7. Three general routines of processing the data have been included. It should be noted, however, that many other routines are possible, as well as alternative combinations of those included in FIG. 7. The first routine is to send the converted data to a recipient(s) (step 500), wherein one or more of the recipients will print the converted data (step 510). In this example, the data may be in Microsoft Word™ format and it is desired to be converted to Postscript format. The printer 8 may not have the available resources to convert the data so the data is sent to the conversion device 10. The conversion device 10 converts the data to Postscript and proceeds to send the converted data to the printer 8, where the data can be printed. The converted data can be sent to the printer 8 in a variety of ways.

A second example routine is to print the converted data directly (step 520). This typically, would require the conversion device 10 to have printing capabilities. The conversion device 10 receives data that must be converted to a specific format. Once converted, the conversion device 10 can print the data directly using the available functional hardware 204.

A third example routine is to store the converted data to hard disk space 222 of the conversion device 10 (step 530) and simultaneously send the data to a recipient device(s) 9. Likewise, the conversion device 10 could send the data to the file server 7, where the data could then be stored in hard disk space available on the file server 7. It could also be possible to store the data in both formats (i.e. pre-converted format and post-converted format).

As mentioned, a wide variety of possible ways of processing the data could be performed, and by a wide variety of devices.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. For example, it will be appreciated by those skilled in the art that the particular format of the information and medium on which it is communicated could be chosen from any means capable of doing so. All such modifications and variations are intended to be included herein within the scope of the present invention and protected by the following claims.

What is claimed is:

1. A data conversion system comprising:
   a remote device operative to communicate a first email message, the first email message comprising:

first information attached to the first email message, the first information exhibiting a first format;

destination information corresponding to a destination to which the first email message is to be sent; and format information corresponding to a second format to which the first information is to be converted;

a conversion device communicatively coupled to the remote device, the conversion device being operative to receive the first email message and, in response thereto, convert the first information from the first format to the second format; and a recipient device communicatively coupled to the conversion device, wherein the conversion device is further configured to communicate the first information to the recipient device via email using a second email message, with the first information exhibiting the second format.

2. The system of claim 1, wherein the first email message further comprises processing information corresponding to a manner in which the first information is to be processed.

3. The system of claim 2, wherein the conversion device forwards the processing information to the recipient device in the second email message.

4. The system of claim 2, wherein the processing information corresponds to printing of the first information at the destination identified by the destination information.

5. The system of claim 4, wherein the processing information corresponds to printing of the first information automatically at the recipient device.

6. The system of claim 1, wherein the remote device is any one of the following: a personal computer, a notebook computer, a cellular phone, a personal digital assistant (PDA), a network appliance, and a digital sender.

7. A method for converting information from a first format to a second format, said method comprising:

communicating a first email message, the first email message comprising:

first information attached to the first email message, the first information exhibiting a first format;

destination information corresponding to a destination to which the email message is to be sent; and format information corresponding to a second format to which the first information is to be converted;

in response to receiving the first email message, automatically converting the first information to the second format; and communicating the first information, in the second format, via a second email, to a recipient device.

8. The method of claim 7, wherein the first email message further comprises processing information corresponding to a manner in which the first information is to be processed.

9. The method of claim 7, wherein the destination information corresponds to an email address of the recipient device.

10. The method of claim 7, wherein:

the conversion device is operative to convert information from a select number of formats to another select number of formats; and the first email message is sent to the conversion device based upon a type of conversion required to convert the first information from the first format to the second format.

11. A data conversion system comprising:

a conversion device communicatively coupled to communication network, the conversion device being operative to receive a first email message comprising:

first information attached to the first email message, the first information exhibiting a first format;

destination information corresponding to a destination to which the first email message is to be sent; and format information corresponding to a second format to which the first information is to be converted;

such that, in response to receiving the first email message, the conversion device converts the first information from the first format to the second format, generates a second email message exhibiting the second format, and transmits the second email message to the destination.

12. The system of claim 11, further comprising:

a remote device operative to communicate the first email message to the conversion device.

13. The system of claim 12, further comprising:

means for communicating the first email message to the conversion device.

14. The system of claim 12, wherein the remote device is any one of the following: a personal computer, a notebook computer, a cellular phone, a personal digital assistant (PDA), a network appliance, and a digital sender.

15. The system of claim 11, further comprising:

a recipient device communicatively coupled to the conversion device and associated with the destination such that the remote device receives the second email message with the information in the second format.

16. The system of claim 15, further comprising:

means for receiving the second email message with the information in the second format.

17. The system of claim 11, wherein the first email message further comprises processing information corresponding to a manner in which the first information is to be processed.

18. The system of claim 17, wherein the conversion device forwards the processing information to a recipient device in the second email message.

19. The system of claim 17, wherein the processing information corresponds to printing of the first information at the destination identified by the destination information.

20. The system of claim 19, wherein the processing information corresponds to printing of the first information automatically at a recipient device.

* * * * *

UNITED STATES PATENT AND TRADEMARK OFFICE
CERTIFICATE OF CORRECTION

PATENT NO. : 6,980,137 B2  Page 1 of 1
APPLICATION NO. : 10/104822
DATED : December 27, 2005
INVENTOR(S) : Travis J. Parry et al.

It is certified that error appears in the above-identified patent and that said Letters Patent is hereby corrected as shown below:

On the cover page, item (75), in "Inventors", in column 1, line 1, delete "B ise" and insert -- Boise --, therefor.

On the cover page, item (75), in "Inventors", in column 1, line 2, delete "M ridian" and insert -- Meridian --, therefor.

Signed and Sealed this

Thirty-first Day of August, 2010

David J. Kappos
*Director of the United States Patent and Trademark Office*